United States Patent [19]

Okazaki et al.

[11] Patent Number: 5,357,493
[45] Date of Patent: Oct. 18, 1994

[54] MAGNETO-OPTIC MEMORY DEVICE FOR OVERWRITING INFORMATION ON MAGNETO-OPTIC RECORDING MEDIUM BY USING A PAIR OF LIGHT SPOTS WITHOUT USING AN EXTERNAL MAGNETIC FIELD

[75] Inventors: Yukinori Okazaki; Mieko Kobukata, both of Osaka, Japan

[73] Assignee: Matsushita Electric Industrial Co., Ltd., Osaka, Japan

[21] Appl. No.: 933,771

[22] Filed: Aug. 24, 1992

Related U.S. Application Data

[63] Continuation-in-part of Ser. No. 696,991, May 3, 1991, abandoned, which is a continuation of Ser. No. 329,785, May 13, 1989, abandoned.

[30] Foreign Application Priority Data

Jul. 24, 1987 [JP] Japan ............................. 62-186244

[51] Int. Cl.$^5$ ............................................. G11B 13/04
[52] U.S. Cl. ............................................. 369/13; 360/59
[58] Field of Search ............................. 369/13, 110, 14; 360/59, 114; 365/122

[56] References Cited

U.S. PATENT DOCUMENTS

| | | | |
|---|---|---|---|
| 4,539,662 | 9/1985 | Hatano et al. | 369/13 |
| 4,549,287 | 10/1985 | Hatano et al. | 369/13 |
| 4,771,413 | 9/1988 | Nago | 369/110 |
| 4,853,912 | 8/1989 | Akasaka et al. | 369/13 |
| 4,944,037 | 7/1990 | Ando | 369/13 |
| 5,208,799 | 5/1993 | Nakao et al. | 369/13 |

*Primary Examiner*—Robert J. Pascal
*Assistant Examiner*—Tan Dinh
*Attorney, Agent, or Firm*—Stevens, Davis, Miller & Mosher

[57] ABSTRACT

In a magneto-optic memory device for recording information on a magneto-optic recording medium having a magneto-optic recording film irradiated by a first small diameter light spot and a second larger diameter light spot which is substantially concentric with the first light spot, the temperature of a portion of the recording film around a recording position is changed by the irradiation of the second light spot in accordance with an information signal to be recorded, between a temperature, which is lower than a compensation temperature of the recording film and produces spontaneous magnetization of the recording film having intensity necessary for recording information, and a temperature which is higher than the compensation temperature of the recording film and produces spontaneous magnetization of the recording film having intensity necessary for recording information, and the intensity of the first light spot is increased to raise the temperature of the recording position of the recording film so as to reach near the Curie temperature of the recording film, thereby erasing old information and recording new information at the same time.

3 Claims, 7 Drawing Sheets

FIG. 8A  T = Troom

FIG. 8B  Troom < T < Tcomp

FIG. 8C  Tcomp < T < Tc

FIG. 8D  T ~ Tc
(PIT RECORDING)

FIG. 8E  T = Troom

FIG. 9A  T = Troom

FIG. 9B  Troom < T < Tcomp

FIG. 9C  Tcomp < T < Tc

FIG. 9D  T ~ Tc
(PIT ERASING)

FIG. 9E  T = Troom

MAGNETO-OPTIC MEMORY DEVICE FOR OVERWRITING INFORMATION ON MAGNETO-OPTIC RECORDING MEDIUM BY USING A PAIR OF LIGHT SPOTS WITHOUT USING AN EXTERNAL MAGNETIC FIELD

CROSS-REFERENCE TO RELATED APPLICATIONS

This application is a continuation-in-part application Ser. No. 07/696,991, filed May 3, 1991 and now abandoned which is a continuation of application Ser. No. 07/329,785, filed May 13, 1989 and now abandoned.

BACKGROUND OF THE INVENTION

The present invention relates to a magneto-optic memory device using a magneto-optic (MO) recording medium such as a magneto-optic disk or the like and, more particularly, to a device having a function to overwrite information.

In recent years, practical use of an information recording device of the read only type or write once type using an optical disk to store a large capacity of information has begun. On the other hand, an information recording device of the information erasable and rewritable type using a magneto-optic recording medium or phase change type medium (hereinafter referred to as the rewritable type) has been increasingly developed. Among the rewritable type recording media, in particular, the magneto-optic recording medium is a recording medium which can be most easily put into practical use with respect to the medium life or reproduced signal characteristics.

However, in the magneto-optic recording medium, it is difficult to perform erasure/rerecording (namely, overwriting) by the overwriting of information, which has been realized in a magnetic disk or the like, thereby causing a large obstacle when a magnetic disk is replaced by a magneto-optic disk. This is because, in the case of the magneto-optic recording medium, the heat of a laser beam spot and the external magnetic field are used to record/erase information, and the recording/erasing operations are switched by switching coils for generating the external magnetic fields, which are arranged at positions apart from the magneto-optic recording medium, or by mechanically changing the direction of a permanent magnet, so that high speed modulation of a large magnetic field cannot be performed, so that the overwriting cannot be performed satisfactorily.

The magneto-optic disk has been disclosed, for instance, in "MAGNETO-OPTIC DISK STORAGE", IEEE Transaction on Magnetics, Vol. MAG-18, No. 6, pages 1233 to 1237, November 1982.

Figure 1:
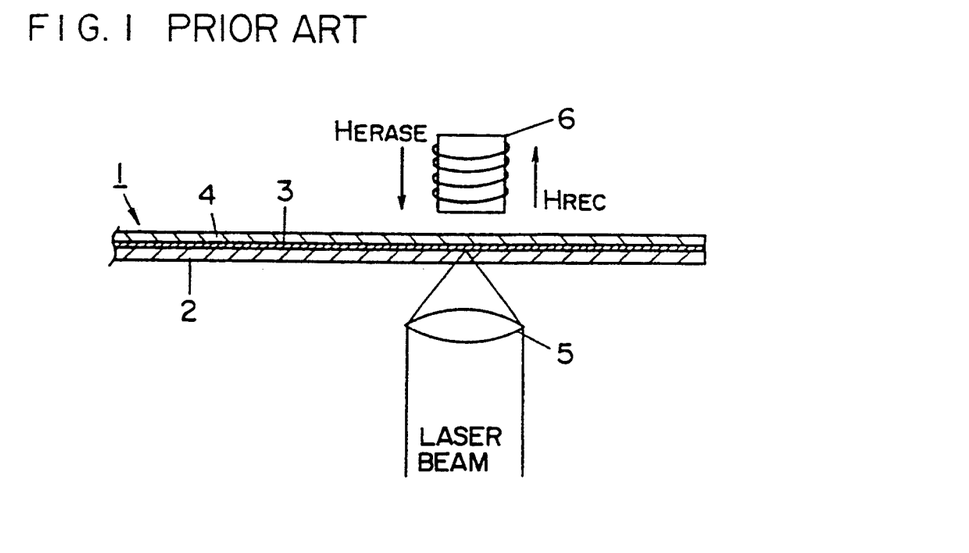
FIG. 1 is a cross sectional view of a magneto-optic memory device of a conventional example.
Figure 2:
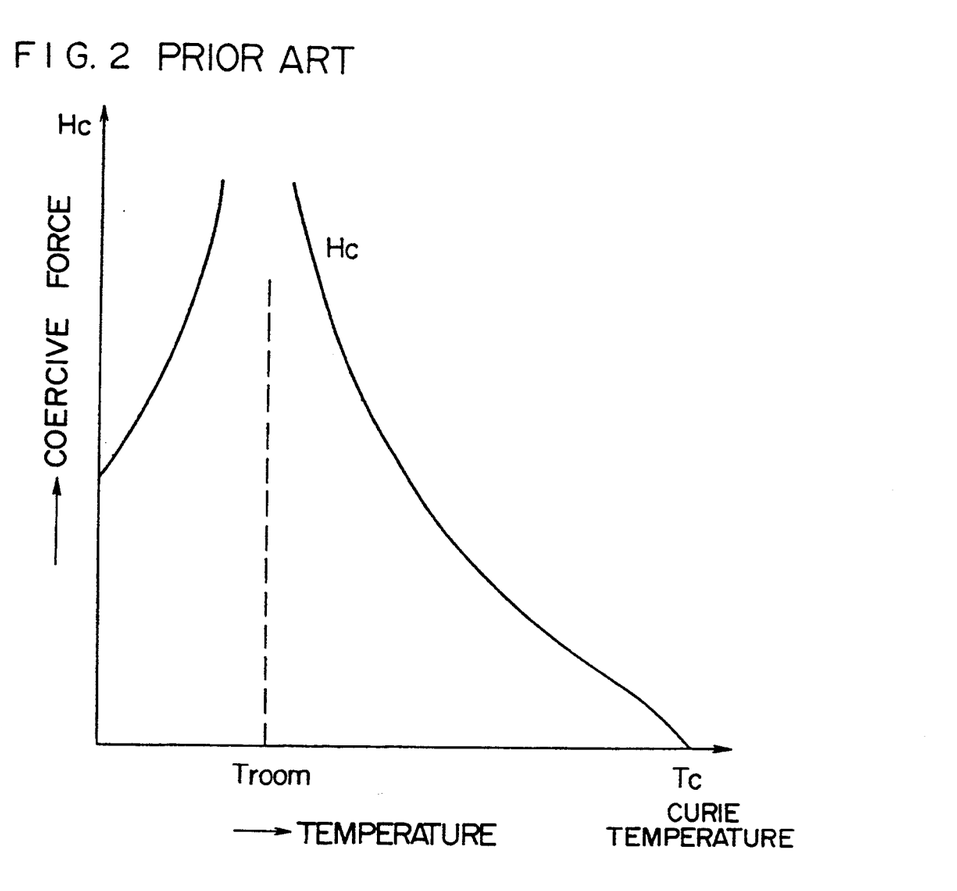
FIG. 2 is a coercive force characteristic diagram of the magneto-optic recording film.

The operations of recording and erasing information onto and from the magneto-optic recording medium will be described in conjunction with the drawings with respect to a magneto-optic disk, as an example. FIG. 1 is a diagram showing a conventional construction of the magneto-optic disk. FIG. 2 is a diagram showing temperature characteristics of a coercive force of a magneto-optic film which is used in the magneto-optic disk. A magneto-optic disk 1 is constructed by coating a magneto-optic recording film 3 onto a transparent substrate 2 and by further covering the film 3 with a protective film 4. Reference numeral 5 denotes a condenser lens as a part of an optical system for emitting a laser beam for recording and reproducing, and reference numeral 6 indicates an external magnetic field generating coil which is used in recording and erasing.

As shown in FIG. 2, as a magneto-optic recording film 3 which has been used conventionally, there is used a film having characteristics such that its coercive force has a high value, and hence magnetization inversion thereof is not easily caused by an external magnetic field at a temperature within the temperature range from −10° C. to 60° C. (hereinafter, referred to as $T_{ROOM}$) at which temperature the magneto-optic recording medium is actually used in order to reproduce information. The operations of recording and erasing information will be described hereinbelow in conjunction with FIGS. 1 and 2. It is assumed that the magneto-optic recording film 3 in FIG. 1 has previously been magnetized downwardly and perpendicularly with respect to the film surface before information is recorded. The intensity of the laser beam focused onto the recording film 3 by the condenser lens 5 is enhanced when information is recorded or erased. The temperature of the recording film 3 at a portion thereof to which the laser beam is irradiated is raised to a value near the Curie temperature $T_C$ of about 200° C., for example. As shown in FIG. 2, when the temperature of the recording film 3 rises to a value near the Curie temperature $T_C$, its coercive force decreases, and the magnetization direction can easily be inverted by an external magnetic field. At the time of recording information, when an upward magnetic field $H_{REC}$ is given to the recording film 3 by the coil 6 in the above-mentioned state, inversion of the magnetization direction occurs, and a magnetic domain having upward magnetization is formed as an information pit. At the time of erasing information, in a manner similar to the recording operation, the temperature of the recording film 3 is increased to a value near the Curie temperature $T_C$ by the focused laser beam, and, at the same time, a magnetic field $H_{ERASE}$ in a direction opposite to that applied when recording information is applied as an external magnetic field by the coil 6, thereby erasing information.

Figure 3:
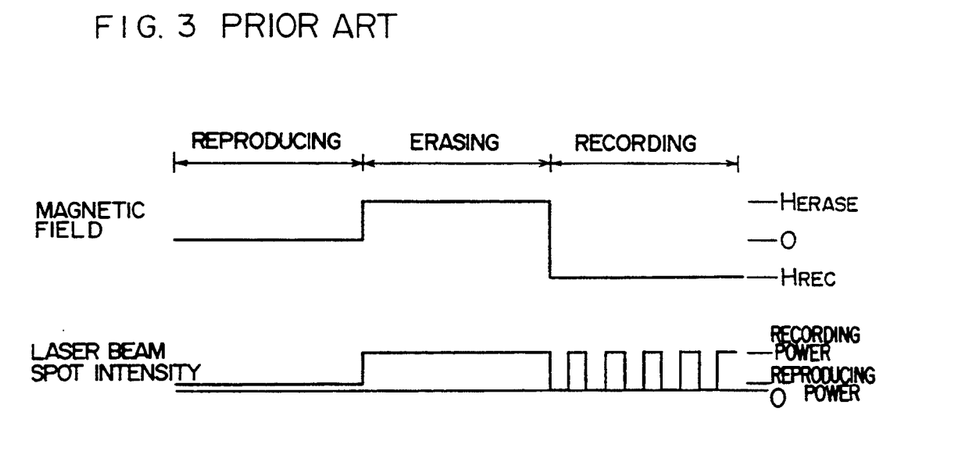
FIG. 3 is a characteristic diagram showing the external magnetic field and a change of the intensity of a light spot.

The intensity and direction of the magnetic field which is applied by the coil 6 when recording and erasing information and the change in intensity of a spot of the laser beam will be described with reference to the drawings. FIG. 3 is a diagram showing magnetic fields applied upon general reproducing, recording and erasing of a magneto-optic disk and the change in intensity of a laser beam spot. In FIG. 3, no magnetic field is applied when information is reproduced, and the intensity of the laser beam spot is also set to a low level. Next, when information is newly recorded at a portion of the recording film 3 where information has already been recorded, there has conventionally been used a method in which the recorded information at such a portion of the recording film 3 is first erased, and, thereafter, new information is recorded. That is, the magnetic field is set to the erasing direction ($H_{ERASE}$), the intensity of the laser beam spot is raised, and the magnetization direction of the information recorded portion is aligned to the magnetization in the erasing direction, thereby erasing the recorded information. After that, the set direction of the magnetic field is inverted to the direction of the magnetic field $H_{REC}$ in the recording direction, and the intensity of the laser beam spot is modulated in accordance with an information signal to be recorded, so that the magnetization direction of the magneto-optic recording film 3 is partially inverted to thereby record information.

However, with such a conventional recording and erasing method, when new information is overwritten on the recording film 3 on which information has previously been recorded, it is necessary that the previous information first be erased, and that thereafter the laser beam be returned again to the information erased track to record new information. Thus, it is necessary to make the laser beam spot trace and irradiate the same position twice in order to record information there once.

On the other hand, in the case of a magnetic recording medium such as a magnetic disk or the like, it is possible to overwrite information by a single tracing operation, so that the information transfer speed of the magneto-optic disk (abbreviated as the M-O disk) when recording information is half or less of that of the magnetic disk. Therefore, in order to make the M-O disks suitable to replace magnetic disks in application fields in which magnetic disks have conventionally been used, it is necessary for the M-O disks to be improved so as to be provided with an overwriting means which is equal to or better than that employed with magnetic disks and to solve the above-described problem that the information transfer speed is slow in the M-O disks.

As methods of performing overwriting with M-O disks, there have hitherto been proposed a system using magnetic field modulation, a system for inverting the magnetization direction of recording at every rotation of the disk, a system using a magneto-optic disk medium of a double-layer film structure, etc. However, those systems also have respective drawbacks. Particularly, when considering the use of an M-O disk as a data file in place of the magnetic disk, each of the aforesaid systems encounters difficulties when attempted to be put into practical use.

For instance, in the case of the system using magnetic field modulation, when information is recorded, the light intensity is always set to be high, and the direction of the magnetic field which is applied by the coil is changed to the recording direction or the erasing direction in accordance with an information signal. However, there is a limitation when the direction of the magnetic field is changed at a high speed in accordance with the information signal. This is because an electromagnetic coil which is placed at a position apart from the magneto-optic film by several mm is used as means for generating a magnetic field which can be modulated and a magnetic field as large as several hundred Oe is generated on the magneto-optic film. As a result, the number of turns of the electromagnetic coil increases, and the inductance of the electromagnetic coil becomes large, and therefore the modulation of a current flowing through the electromagnetic coil, that is, the modulation of the magnetic field by the information signal having a frequency as high as several MHz, becomes difficult. Further, there has also been made an attempt such that a distance between the magneto-optic film and the electromagnetic coil is reduced to reach a few $\mu$m and the number of turns of the electromagnetic coil, which is necessary to generate the same magnetic field, is reduced, thereby enabling the modulation of the magnetic field at a high frequency. However, in the case of a portable type recording medium such as an optical disk, when considering accidental contact between a magnetic head comprising the electromagnetic coil and the magneto-optic recording film, adhesion of dust onto the recording medium, etc., it is considered to be difficult to use the above-mentioned system as a data file which requires high reliability. As mentioned above, it has been difficult to use such a system in an application such as a data file for computers in which a high information transfer speed is required and high reliability is desired at the same time.

In the system which inverts the magnetization direction at every rotation of the disk, two laser beam spots are used, the magnetic field generated by the electromagnetic coil is inverted at every rotation of the disk, and, while recorded information on one recorded track is erased by one of the two laser beam spots, new information is recorded on one adjacent recording track (which has already been erased one rotation before by the method mentioned above) under the inverted magnetic field. However, in such a system, a time period is required to switch the magnetic field at every rotation of the disk; as a result, an area where information cannot be recorded occurs at a position which the laser beam spot has passed during the switching time period at every rotation of the disk. Further, although such a system is effective when continuously recording a relatively large amount of information such as in image or music applications or the like, it is disadvantageous in that it cannot be used in applications requiring high throughput, such as a data file in which one rotation of the disk is divided into several sectors and information is recorded on a relatively small information unit basis.

On the other hand, in the system using the M-O disk of a double-layer film structure which has recently been proposed, one optical head for irradiating a recording medium with a laser beam spot and two external magnetic fields are used. The first layer having a small coercive force is erased only by the first external magnetic field, the magnetic field in the erasing direction for the erased first layer and the magnetic field in the recording direction of the second external magnetic field are selected, and information is recorded in the second layer. Although such a system is capable of overwriting information in principle, the recording medium construction becomes complicated, and besides, a very large magnetic field is required as the first external magnetic field, so that it will be difficult to put it into practical use.

As described above, when considering particularly an application to a data file, the M-O disk conventionally has had a problem such that it is difficult for it to overwrite information.

SUMMARY OF THE INVENTION

It is an object of the present invention to solve the foregoing problems and to provide means which can realize overwriting of information at a high speed in a magneto-optic memory device.

To accomplish the above object, in a magneto-optic memory device of the present invention, a ferrimagnetic material having a compensation temperature, which lies between the temperature of a magneto-optic recording film at the time of reproducing information therefrom and the Curie temperature of the ferrimagnetic material and at which the ferrimagnetic material has spontaneous magnetization having intensity necessary for recording information, is used as a magneto-optic recording medium, and the magneto-optic memory device comprises: means for focusing a first light spot, which has been converged to near its diffraction limit, and a second light spot, which has a wavelength different from a wavelength of the first light spot and has a light spot diameter greater than a diameter of the first light spot and which is substantially concentric with the first light spot, onto an information recording position on the recording medium; means for raising the intensity of the first light spot when recording information so as to raise the temperature at the information recording position on the recording medium to near the Curie temperature; and modulating means for modulating the intensity of the second light spot so that a temperature around the information recording position of the recording medium changes between a temperature, which is lower than the compensation temperature of the recording medium and at which the recording medium has spontaneous magnetization having intensity necessary for recording information, and a temperature, which is higher than the compensation temperature of the recording medium and at which the recording medium has spontaneous magnetization having intensity necessary for recording information, in accordance with an information signal to be recorded.

With the above construction of the magneto-optic memory device of the present invention, the magnetic field generated by the spontaneous magnetization around an information recording position is used as an external magnetic field which is necessary for recording and erasing information, and further a fact that the magnetization direction of the magneto-optic recording film is inverted between the temperatures below and above the compensation temperature is utilized, and the temperature of the recording film around the information recording position is changed between a temperature, which is lower than the compensation temperature of the recording film and at which the recording film has spontaneous magnetization having intensity necessary for recording information, and a temperature, which is higher than the compensation temperature of the recording film and at which the recording film has spontaneous magnetization having intensity necessary for recording information, thereby inverting the direction of the magnetic field at the information recording position caused by the neighboring magnetization and thereby erasing and rerecording (overwriting) information.

To realize the above operations, according to the construction of the magneto-optic recording device the present invention, in addition to the first light spot which is used to record and reproduce information, the second light spot, which is substantially concentric with the first light spot and which has a larger light spot diameter than that of the first light spot and has a wavelength different from a wavelength of the first light spot, is focused on the recording film, and the intensity of the second light spot is modulated by the information signal to be recorded. When the intensity of the second light spot is changed by the information signal, the temperature around the information recording position of the recording film changes between a temperature, which is lower than the compensation temperature of the recording film and at which the recording film has spontaneous magnetization having intensity necessary for recording information, and a temperature, which is higher than the compensation temperature of the recording film and at which the recording film has spontaneous magnetization having intensity necessary for recording information. As a result, the magnetization direction at the information recording position is inverted, whereby the erasure and rerecording (overwriting) of information are realized.

Further, in the present invention, a light source means for producing first and second light spots is constructed to include first and second lasers of different wavelengths, respectively, so that it becomes possible easily to produce the first and second light spots on the disk by the use of a signal detection optical system of the magneto-optic disk which detects a change of the direction of polarization of light.

Besides, according to the magneto-optic memory device of the present invention constructed so that the intensity of the first light spot is modulated in accordance with a change of the intensity of the second light spot at the time of recording information, it is made possible to fix a range of a temperature rise on the magneto-optic recording medium caused by the irradiation of the first light spot in respective cases of the recording and erasing of information.

According to the above-described construction and operation of the magneto-optic memory device of the present invention, by recording new information on the information which has previously been recorded on the recording medium, the rewriting of information, namely, the overwriting can be realized.

DESCRIPTION OF THE PREFERRED EMBODIMENTS

Figure 4:
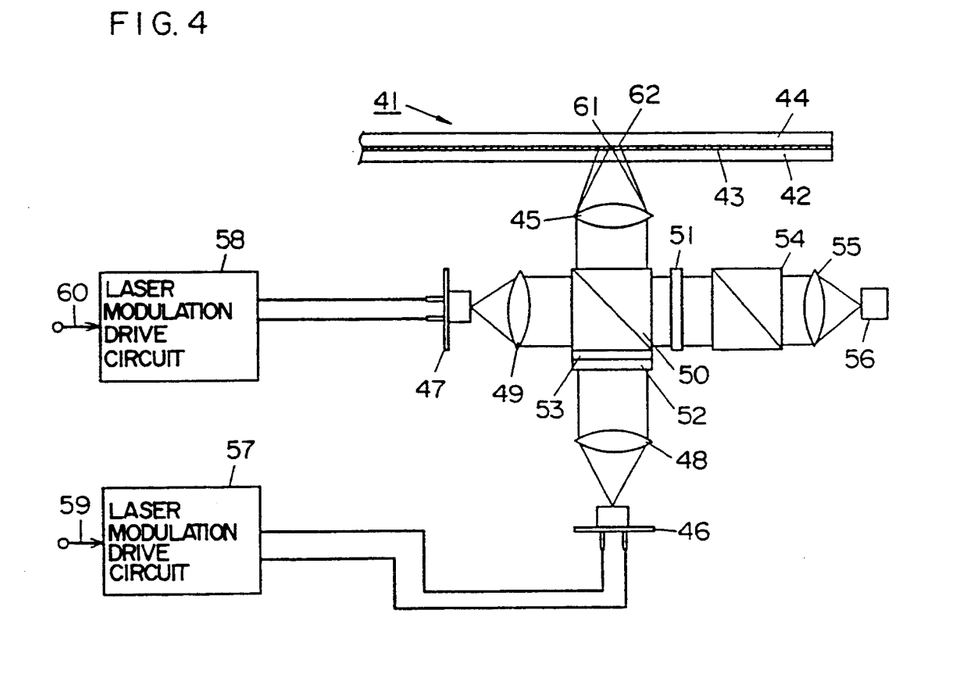
FIG. 4 is a block diagram showing a construction of a magneto-optic disk memory device of a first embodiment of the present invention.

Embodiments of a magneto-optic memory device of the present invention will be described hereinbelow with reference to the drawings. FIG. 4 is a diagram showing a construction of a magneto-optic disk memory device of a first embodiment of the magneto-optic memory device of the present invention. A magneto-optic disk 41 which is used in the magneto-optic disk memory device shown in FIG. 4 has a transparent substrate 42, a magneto-optic recording film 43, and a protective film 44. The disk memory device comprises a condenser lens 45; a light source laser 46 for a first spot; a light source laser 47 for a second spot; collimating lenses 48 and 49 for the respective light source lasers 46 and 47; a beam splitter 50; a light separating filter 51; a dichroic mirror 52; a quarter-wave plate 53; an analyzer 54; a condenser lens 55; a photodetector 56; a light source laser modulation drive circuit 57 for the first spot; and a light source laser modulation drive circuit 58 for the second spot. A switching signal 59 for recording or reproducing information is supplied to the light source laser modulation drive circuit 57 for the first spot. An information signal 60 is supplied to the light source laser modulation drive circuit 58 for the second spot.

The magneto-optic disk memory device of the first embodiment constructed as described above is explained as follows. In FIG. 4, a laser beam emitted from the light source laser 46 to form the first laser beam spot and a laser beam emitted from the light source laser 47 to form the second laser beam spot pass through the optical system, respectively, and are focused by the condenser lens 45 to produce a first laser beam spot 61 and a second laser beam spot 62 on the magneto-optic recording film 43 formed on the optical disk 41 in such a way that the centers of the laser beam spots substantially coincide with each other.

As the light source lasers 46 and 47, it is possible to use two kinds of lasers having different wavelengths, for example, a semiconductor laser having a wavelength of 780 nm and a semiconductor laser having a wavelength of 830 nm, respectively. This embodiment relates to the case where the two laser beams of different wavelengths are used as light sources. In FIG. 4, the dichroic mirror 52 is a mirror having reflecting characteristics which differ in dependence on the wavelength. In the case of this embodiment, the dichroic mirror 52 is arranged to reflect the light emitted from the light source laser 47 and to allow the light emitted from the light source laser 46 to pass. Therefore, the laser beam emitted from the light source laser 46 for the first light spot is collimated into parallel rays by the collimating lens 48 and enters the dichroic mirror 52. The laser beam is transmitted through the dichroic mirror 52 and enters the beam splitter 50. The laser beam transmitted through the beam splitter 50 is focused by the condenser lens 45, and the first laser beam spot 61 is formed on the magneto-optic recording film 43.

The laser beam spot 61 is controlled by the laser modulation drive circuit 57 so as to become strong in the recording and erasing mode and to become weak in the reproducing mode in accordance with the recording/reproducing switching signal 59.

When reproducing the recorded information from the magneto-optic recording film 43, the light reflected from the magneto-optic recording film 43 is reflected by the beam splitter 50 and is separated from the laser beam from the second laser 47 by the light separating filter 51. Only the polarization rotation component formed by the magneto-optic recording film 43 is extracted by the analyzer 54 and is taken out as an information reproduction signal from the photodetector 56.

On the other hand, the laser beam emitted from the light source laser 47 for forming the second laser beam spot is collimated into parallel rays by the collimating lens 49, in a manner similar to the laser beam emitted from the light source laser 46 for the first light spot, and is transmitted to the beam splitter 50. The beam splitter 50 reflects the laser beam. The reflected laser beam passes through the quarter-wave plate 53 and is reflected by the dichroic mirror 52 and is again transmitted through the quarter-wave plate 53. The polarizing direction of this laser beam is rotated by 90° in total. Then, this laser beam is transmitted through the beam splitter 50 and is focused by the condenser lens 45, and the second laser beam spot 62 is formed on the magneto-optic recording film 43.

The relationship between the two laser beam spots 61 and 62 on the magneto-optic recording film 43 will be explained with reference to FIG. 5.

Figure 5:
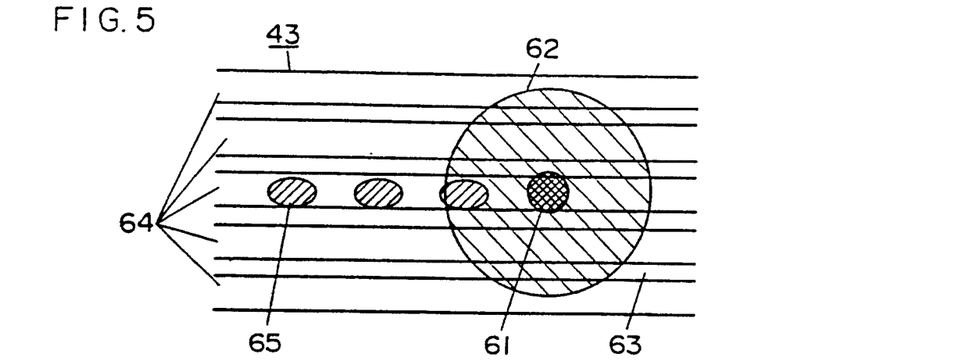
FIG. 5 is a plan view for explaining the distribution of laser beam spots in the first embodiment.

FIG. 5 is a diagram showing an example of the relationship between the two laser beam spots and the recording pits on the magneto-optic recording film 43. The first laser beam spot 61 is converged to near its diffraction limit and in focused along information tracks 64 which are formed by guide grooves 63. The second laser beam spot 62 is focused so that its center substantially coincides with that of the first laser beam spot 61, but the diameter of the spot 62 is larger than that of the first laser beam spot 61. Recording pits 65 are formed along the information tracks 64 in accordance with changes of the intensity of the first laser beam spot 61 and the second laser beam spot 62.

An example of intensity changes in the recording and reproducing modes of the first and second laser beam spots will be described with reference to FIG. 6.

Figure 6:
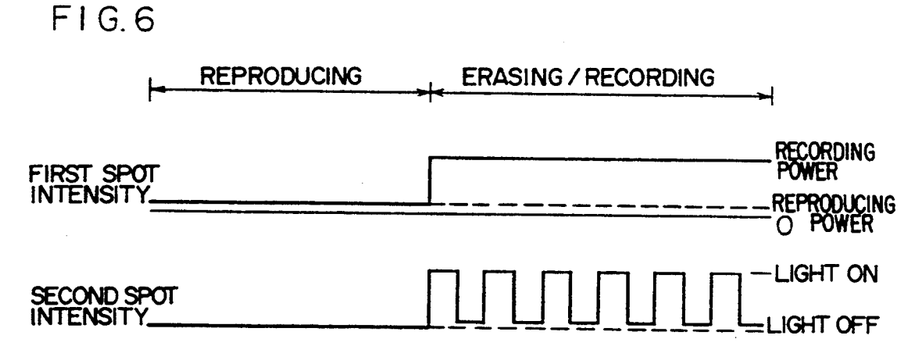
FIG. 6 is a characteristic diagram for explaining an example of changes of the intensity of the laser beam spots in the first embodiment of the present invention.

FIG. 6 is a diagram showing an example of changes with time of the intensity of the first laser beam spot 61 and that of the second laser beam spot 62 in the reproducing mode and the recording mode in the first embodiment. In the reproducing mode, the intensity of the first laser beam spot 61 is set to have a power of about 1 to 2 mW on the magneto-optic recording film 43, and the intensity of the second laser beam spot 62 is set to zero level. Such values are the same as those in the reproducing mode of the conventional magneto-optic disk. Next, in the overwriting mode, the intensity of the first laser beam spot 61 is maintained at high level of about 6 to 10 mW on the magneto-optic recording film 43, and the intensity of the second laser beam spot 62 is modulated in a range between the low intensity level and the high intensity level in accordance with the information signal 60 applied to the light source laser modulation drive circuit 58. In FIG. 6, the intensity of the first laser beam spot 61 is controlled by the recording/reproducing switching signal 59 applied to the light source laser modulation drive circuit 57, and the intensity of the second laser beam spot 62 is controlled by the information signal 60.

The principle of the method of overwriting information according to the present invention will be described with reference to FIGS. 7 to 9.

Figure 7:
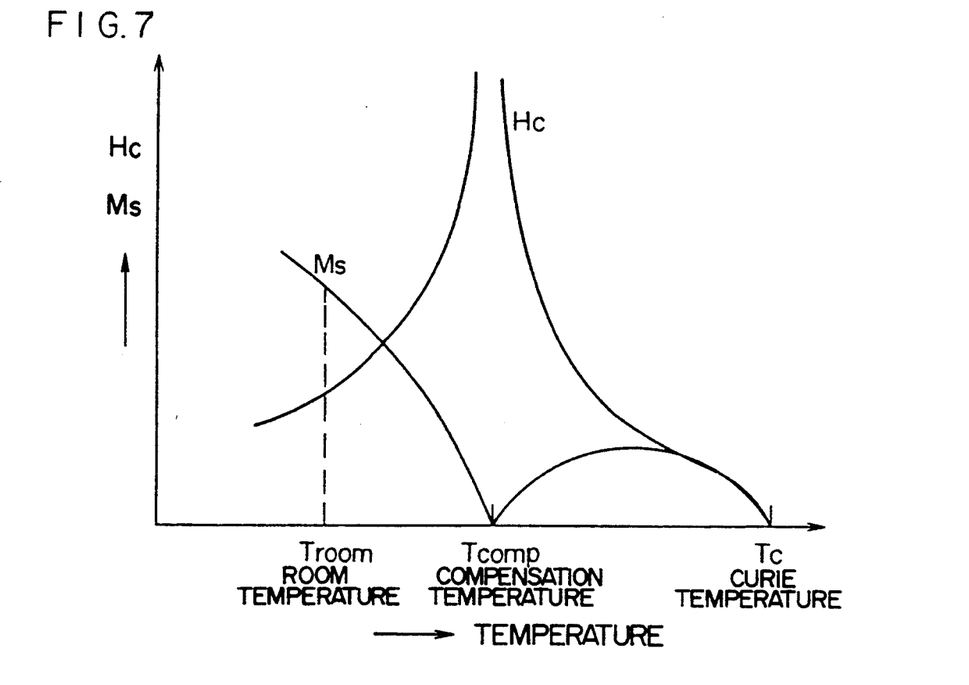
FIG. 7 is a characteristic diagram for explaining the characteristics of a magneto-optic recording film which is used in the present invention.

FIG. 7 is a diagram showing temperature characteristics of the coercive force $H_C$ and the spontaneous magnetization $M_S$ of the magneto-optic recording film 43 composed of a ferrimagnetic material which is used in the present invention. In FIG. 7, $T_{ROOM}$ denotes the room temperature, $T_{COMP}$ indicates a compensation temperature, and $T_C$ represents the Curie temperature. At the compensation temperature $T_{COMP}$, in the magneto-optic recording film 43 which is constructed to be magnetized in the direction perpendicular to the film surface, the magnitude of the magnetization in the upward direction and the magnitude of the magnetization in the downward direction with respect to the film surface balance with each other, so that the apparent spontaneous magnetization is canceled out, and conversely the coercive force becomes maximum. On the other hand, at temperatures on either side of (i.e., lower or higher than) the compensation temperature $T_{COMP}$, the magnitude of the magnetization in the upward or downward magnetizing direction increases, so that the spontaneous magnetization is generated. Therefore, at temperatures higher and lower than the compensation temperature $T_{COMP}$, the direction of spontaneous magnetization is inverted, and hence the direction of the magnetic field generated around the information recording portions by the local magnetization of the magneto-optic recording film 43 is also inverted. The inversion speed of the magnetization due to a temperature change and the resultant inversion speed of the peripheral magnetic field are determined by the temperature response characteristic of the magneto-optic recording film 43. It is readily possible to achieve a response time in the order of several tens of nsec. Therefore, the direction of the peripheral magnetic field, which is used to record information, can be modulated at a high speed by putting the information recording portion in the state of a temperature higher than the compensation temperature $T_{COMP}$ and the state of a temperature lower than the compensation temperature $T_{COMP}$ by changing the intensity of the laser beam spot.

A state of the inversion of the magnetization direction in the actual recording operation will be described with reference to FIGS. 8A to 8E. FIGS. 8A to 8E are cross sectional views of an information recording portion of the magneto-optic recording film 43, and show changes of the direction of the magnetization at the information recording portion and in the peripheral area thereof in the cases where the first and second laser beam spots have been irradiated respectively. In FIGS. 8A to 8E, it is assumed that the magneto-optic recording film 43 has first been upwardly magnetized.

Figure 8A:
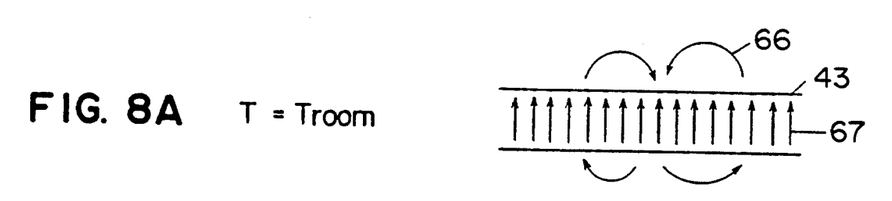
FIGS. 8A to 8E are diagrammatical views for explaining the principle of the information recording operation of the present invention.

(1) Referring to FIG. 8A, when the magneto-optic recording film 43 is at the room temperature $t_{ROOM}$, or in the information reproducing mode in which a relatively low power laser beam spot of about 1 to 2 mW is irradiated, a magnetic field 66 caused by the peripheral magnetization 67 is applied to the information recording position shown at the center portion downwardly in the direction opposite to the initial magnetization direction. However, the initial magnetization direction is not inverted, since the coercive force of the magneto-optic recording film 43 at this temperature is high, and the upward magnetization direction is maintained.

Figure 8B:
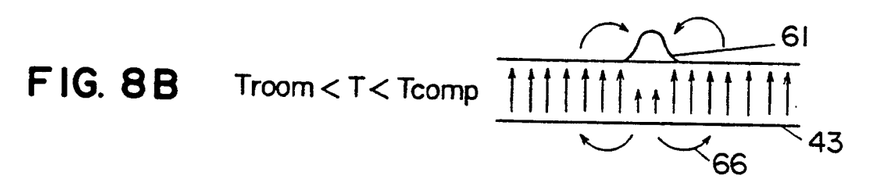

(2) Referring to FIG. 8B, the first laser beam spot 61 irradiates the magneto-optic recording film 43 to thereby raise the temperature of the magneto-optic recording film 43. When the temperature of the magneto-optic recording film 43 approaches the compensation temperature $T_{COMP}$, the magnetization at the first laser beam spot irradiating position decreases, with the upward magnetization direction maintained, in accordance with the temperature characteristic curve of the apparent spontaneous magnetization $M_S$ shown in FIG. 7.

Figure 8C:
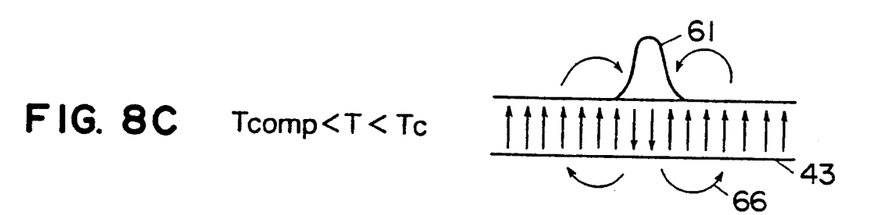

(3) Referring to FIG. 8C, when the intensity of the first laser beam spot 61 rises further, and the temperature of the magneto-optic recording film 43 exceeds the compensation temperature $T_{COMP}$ and rises further, the magnetization direction at the first laser beam spot irradiating position is inverted upon passing beyond the compensation temperature $T_{COMP}$ as a turning point, and the downward magnetization is generated.

Figure 8D:
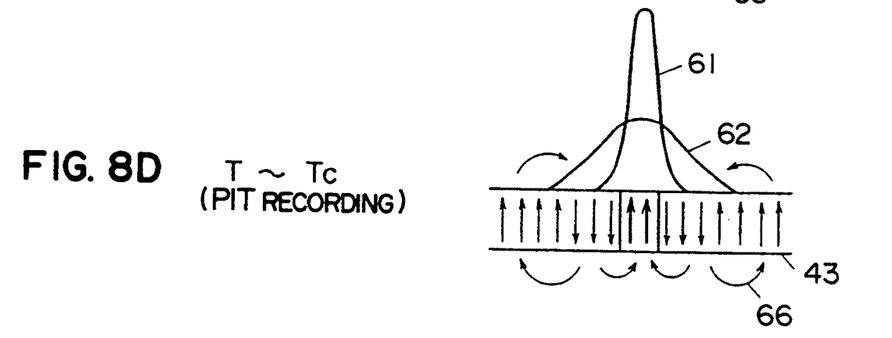

(4) Referring to FIG. 8D, when the intensity of the first laser beam spot 61 is further raised, and, at the same time, the second laser beam spot 62 having a large spot diameter irradiates with its center being substantially coincident with that of the first laser beam spot 61, the temperature of the magneto-optic recording film 43 rises to have a value near the Curie temperature $T_C$, and the coercive force at the first laser beam spot irradiating position decreases greatly, so that there occurs a state in which the magnetization direction is easily inverted by the external magnetic field. If the intensity of the second laser beam spot 62 is set so that the temperature of the magneto-optic recording film 43 is made to reach a temperature which is higher than the compensation temperature $T_{COMP}$ and which causes spontaneous magnetization having the intensity necessary for recording information, the magnetization direction of the portion which the second laser beam spot 62 irradiates is inverted and turns downward. At this time, the direction of the peripheral magnetic field generated by the spontaneous magnetization to exert an influence on an area which the first laser beam spot 61 irradiates is greatly affected by the direction of the neighboring spontaneous magnetization, and the upward neighboring external magnetic field due to the downward spontaneous magnetization caused by the second laser beam spot 62 becomes dominant. Therefore, the portion which the first laser beam spot 61 irradiates is upwardly magnetized by the upward external magnetic field.

Figure 8E:
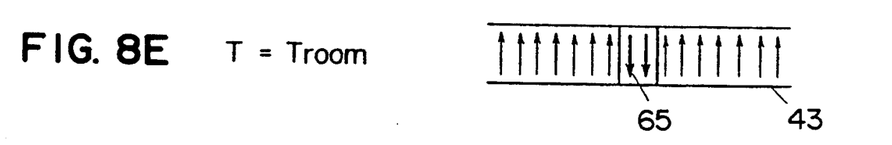

(5) Referring to FIG. 8E, when the irradiation of the laser beam spots is stopped and the temperature of the magneto-optic recording film 43 decreases, the magnetization direction of a portion of the magneto-optic recording film 43 which has been irradiated by the laser beam spots is inverted upon falling of the temperature below the compensation temperature $T_{COMP}$ as a turning point, and a recording pit 65 formed by the downward magnetization is obtained in an area of the upward magnetization.

A state of the inversion of the magnetization direction in the erasing mode of the information pit will now be described with reference to FIGS. 9A to 9B.

Similarly to FIGS. 8A to 8E, FIGS. 9A to 9E are cross sectional views of an information recording portion of the magneto-optic recording film 43 and show changes of the direction of the magnetization at the information recording portion and in the peripheral area thereof in the case where the first laser beam spot has been irradiated onto the information recording portion. In FIGS. 9A to 9E, it is assumed that a recording pit 65 having the downward magnetization has already been recorded at the center portion of the magneto-optic recording film 43 which has first been upwardly magnetized.

Figure 9A:
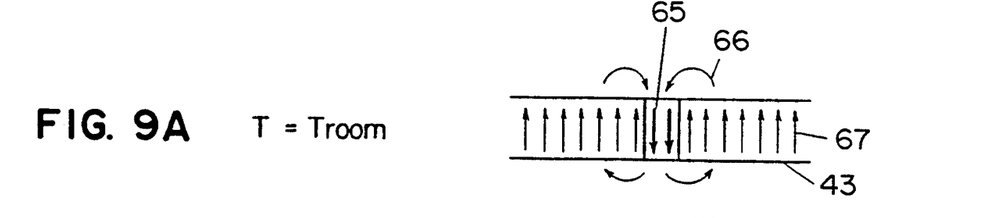
FIGS. 9A to 9E are diagrammatical views for explaining the principle of the information erasing operation of the present invention.

(1) Referring to FIG. 9A, when the magneto-optic recording film 43 is at the room temperature $T_{ROOM}$ or in the information reproducing mode in which a relatively low power laser beam spot of about 1 to 2 mW is irradiated, a magnetic field 66 caused by the peripheral magnetization 67 is applied to the information recording position in the same downward direction as the magnetization direction of the recording pit 65. In conjunction with the high coercive force of the magneto-optic recording film 43 at the room temperature $T_{ROOM}$, the stable recording pit 65 is formed.

Figure 9B:
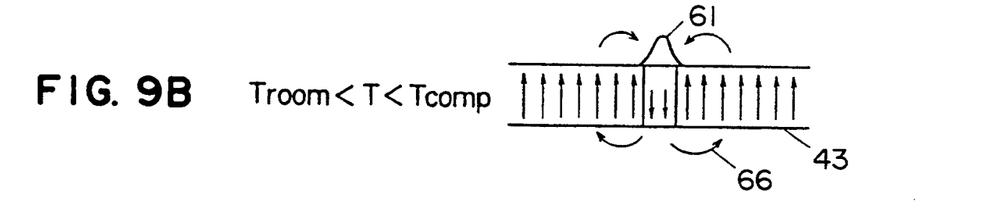

(2) Referring to FIG. 9B, when the first laser beam spot 61 irradiates the magneto-optic recording film 43, and the temperature of the magneto-optic recording film 43 is raised to approach the compensation temperature $T_{COMP}$, the magnetization at the first laser beam spot irradiating position decreases while maintaining its downward direction, in accordance with the temperature characteristic curve of the apparent spontaneous magnetization $M_S$ shown in FIG. 7.

Figure 9C:
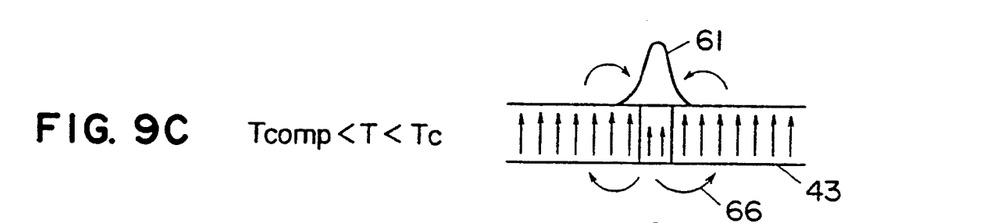

(3) Referring to FIG. 9C, when the intensity of the first laser beam spot 61 rises further, and the temperature of the magneto-optic recording film 43 rises further, exceeding the compensation temperature $T_{COMP}$, the magnetization direction at the first laser beam spot irradiating position is inverted when the temperature passes beyond the compensation temperature $T_{COMP}$ as a turning point, and the upward magnetization is generated.

Figure 9D:
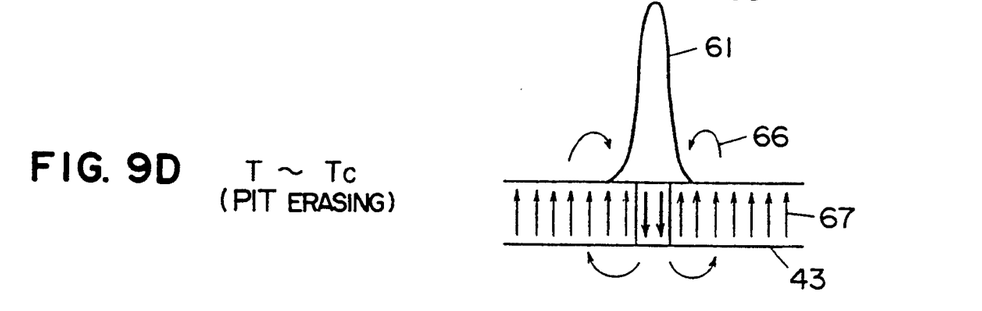

(4) Referring to FIG. 9D, when the intensity of the first laser beam spot 61 is further increased, the temperature of the magneto-optic recording film 43 rises to have a value near the Curie temperature $T_C$, and the coercive force at the first laser beam spot irradiating position decreases greatly, so that there occurs a state in which magnetization inversion is easily caused by the external magnetic field 66. At this time, the direction of the magnetic field 66 caused by the peripheral spontaneous magnetization 67 in an area which the first laser beam spot 61 irradiates is downward. Therefore, the portion which the first laser beam spot 61 irradiates is downwardly magnetized by the downward magnetic field 66.

Figure 9E:
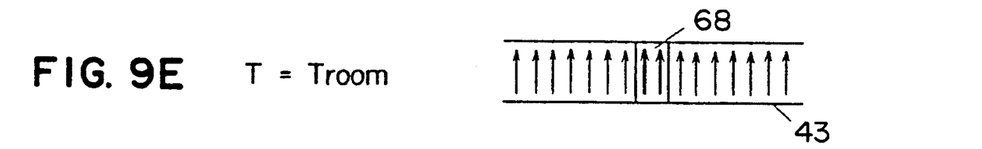

(5) Referring to FIG. 9E, when the irradiation of the laser beam spots is stopped, or in an information reproducing mode in which the irradiation intensity of the laser beam spot is reduced and a relatively low power laser beam spot of about 1 to 2 mW is irradiated, the temperature of the magneto-optic recording medium 43 decreases, and when it passes below the compensation temperature $T_{COMP}$ as a turning point, the downward magnetization at the portion of the magneto-optic recording film 43 where the recording pit 65 has existed is inverted, and this portion turns to an upward magnetization domain having the same magnetization direction as that of the peripheral area. Thus, the recording pit is erased, resulting in an erased pit 68.

As described above, by merely changing the intensity of the second laser beam spot 62, upward and downward magnetization domains can be formed thereby to perform the recording and erasing operations. Therefore, even in the case where information pits have been formed on the magneto-optic recording film 43 or even in the case where no information pit has been formed, it is possible to have the same operation performed. That is, according to the system of the present invention, information can be rewritten by merely overwriting new information without any necessity for a separate operation to preliminarily erase information pits which have already been formed. Thus, the overwriting operation equivalent to that of the magnetic disks can be realized.

Figure 10:
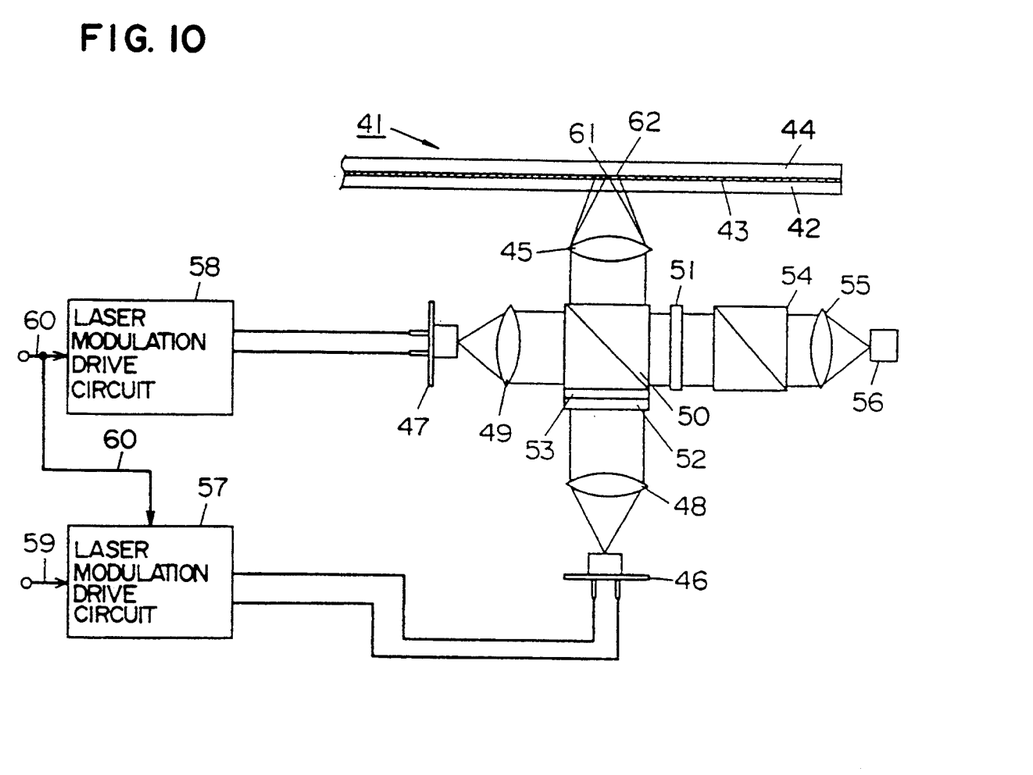
FIG. 10 is a block diagram showing a construction of a magneto-optic disk memory device of a second embodiment of the present invention.

A second embodiment of the present invention will be described with reference to the drawings. FIG. 10 is a block diagram showing a construction of a magneto-optic disk memory device of a second embodiment of the magneto-optic memory device of the present invention. The magneto-optic disk 41 used in the magneto-optic disk memory device shown in FIG. 10 is similar to that of the first embodiment shown in FIG. 4. The construction of this second embodiment is substantially the same as that of the first embodiment of the present invention in FIG. 4 except that the same signal as the information signal 60, which is supplied to the light source laser modulation drive circuit 58 for the second light spot, is supplied to the light source laser modulation drive circuit 57 for the first light spot.

In the magneto-optic disk memory device of the second embodiment of the present invention shown in FIG. 10, paths in the optical system followed by the light beams emitted from the light sources, the detecting method of a signal and the like are the same as those of the first embodiment shown in FIG. 4.

An example of changes of the intensity of the two laser beam spots 61 and 62 on the magneto-optic recording film 43 in the recording and reproducing modes in this second embodiment will be described with reference to FIG. 11.

Figure 11:
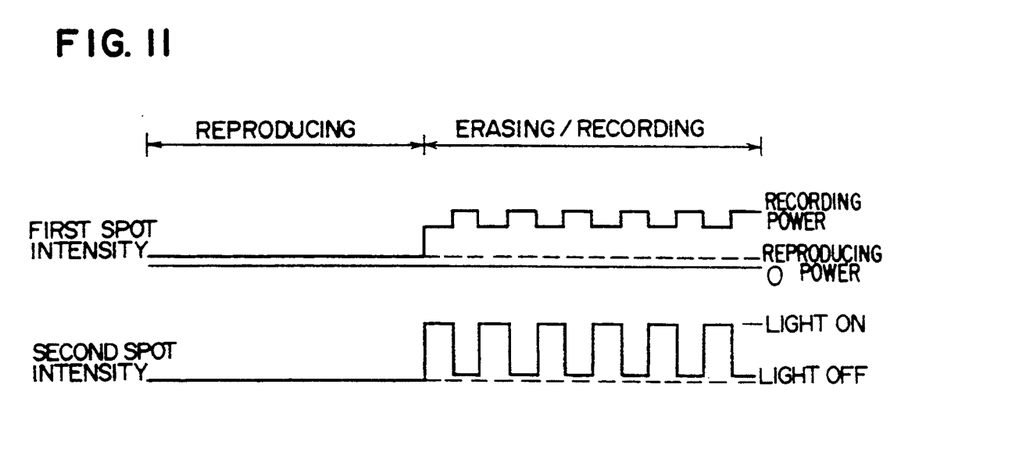
FIG. 11 is a characteristic diagram for explaining an example of changes of the intensity of the laser beam spots in the second embodiment of the present invention.

FIG. 11 is a characteristic diagram which illustrates an example of changes with time of the intensity of the first and second laser beam spots 61 and 62 in the reproducing mode and in the recording mode. In the reproducing mode, the intensity of the first laser beam spot 61 on the magneto-optic recording film 43 is set to a power of about 1 to 2 mW, and the intensity of the second laser beam spot 62 thereon is set to zero. This condition is similar to that in the case of the reproducing mode of a conventional magneto-optic disk and that in the case of the first embodiment of the present invention. With respect to the operation of the overwriting mode, the technical aspect that the intensity of the second laser beam spot 62 is modulated in accordance with an information signal 60 between a low intensity level and a high intensity level is similar to that of the first embodiment shown in FIG. 6. In this second embodiment, however, as is different from the first embodiment, the intensity of the first laser beam spot 61 is also modulated by the information signal 60. In the case of the first embodiment shown in FIG. 6, when information is actually recorded on the magneto-optic recording film 43, as compared with the case of erasing the information, the intensity of the second light spot is made stronger. Thus, the temperature of a portion to which the first light spot is irradiated is raised still more depending on the thermal conductivity of the recording film and-/or the power of the light spot which is irradiated. Therefore, it is considered that the size of an area where the coercive force has dropped, thereby enabling information to be recorded, is increased, so that the size of a pit to be recorded becomes larger than the size of an erasable pit. When erasing a recorded pit in such a state, the recorded pit cannot be sufficiently erased, so that a portion thereof remains unerased. In the second embodiment, in order to prevent such an insufficient overwriting operation, when the intensity of the second light spot is raised at the time of recording information, the intensity of the first light spot is reduced to a small extent by using the same information signal, whereby the size of the area where the coercive force has been reduced by an increase in temperature thereby enabling information to be recorded, can be made equal to or smaller than the corresponding area in the information erasing mode, and as a result, insufficient erasure of information can be avoided.

A third embodiment of the present invention will be described with reference to FIGS. 12 and 13. In the case where the overwriting system of the present invention is used actually in the information recording, it is considered that the temperature characteristics and the like of the magneto-optic recording film 43 may vary with every magneto-optic disk to be used. Therefore, it is necessary to optimally adjust the intensity of the second light spot 62 just before information is recorded or before the operation is shifted to information recording. Thus, the third embodiment relates to a magneto-optic disk memory device which optimally controls the intensity of the second light spot used in the present invention.

Figure 12:
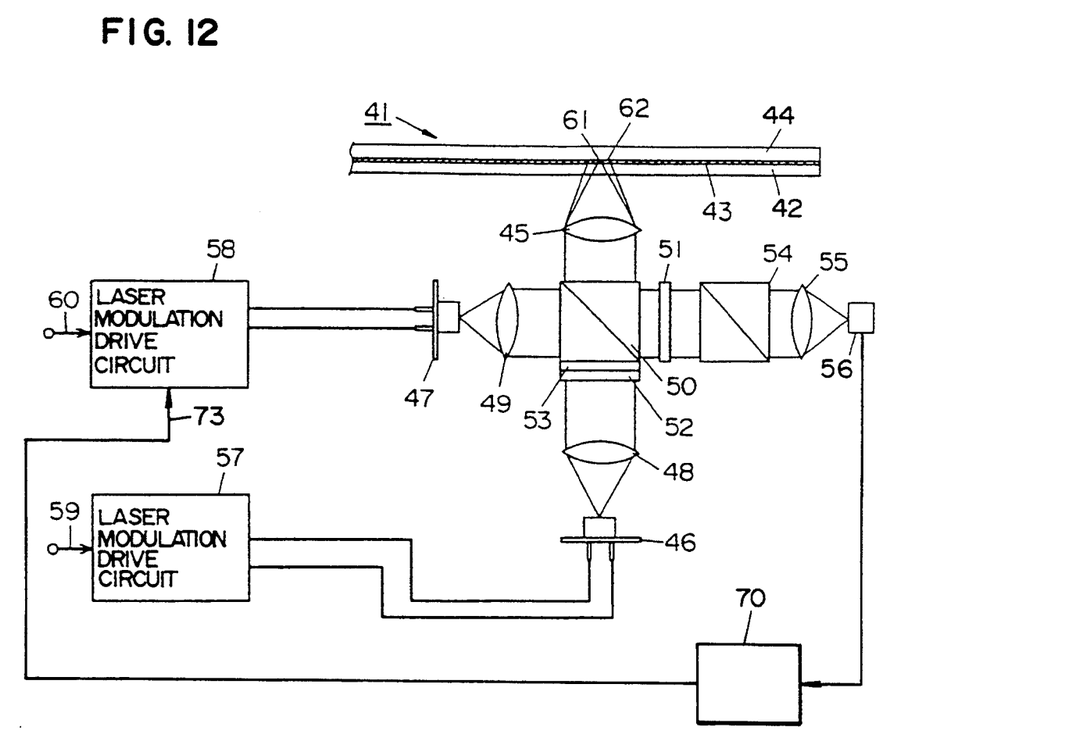
FIG. 12 is a block diagram showing a construction of a magneto-optic disk memory device of a third embodiment of the present invention.

FIG. 12 is a block diagram showing a construction of a magneto-optic disk memory device of the third embodiment of the present invention. The magneto-optic disk 41, which is used in the magneto-optic disk memory device shown in FIG. 12, is similar to that used in the first embodiment shown in FIG. 4. Only, in addition to the construction of the first embodiment shown in FIG. 4, the third embodiment has a construction such that a magneto-optic signal 73, which is obtained through a differential amplifier 70 from the output signal of the photodetector 56 for detecting a reflected light beam from the first light spot 61, is supplied to the light source laser modulation drive circuit 58 for the second light spot.

The operation of the magneto-optic disk memory device constructed as described above will be explained hereunder. In FIG. 12, the paths in the optical system followed by the light beams emitted from the light sources, the detecting method of a signal and the like are the same as those of the first embodiment shown in FIG. 4. In this third embodiment, in addition to the operation of the first embodiment, the light source laser modulation drive circuit 58 is controlled so that the amplitude of the magneto-optic signal 73, which is obtained from the photodetector 56 through the differential amplifier 70 when the intensity of the second light spot is changed during the information recording, may become maximum.

The details of the operation of controlling the intensity of the second light spot in the third embodiment will be described with reference to the drawings.

Figure 13:
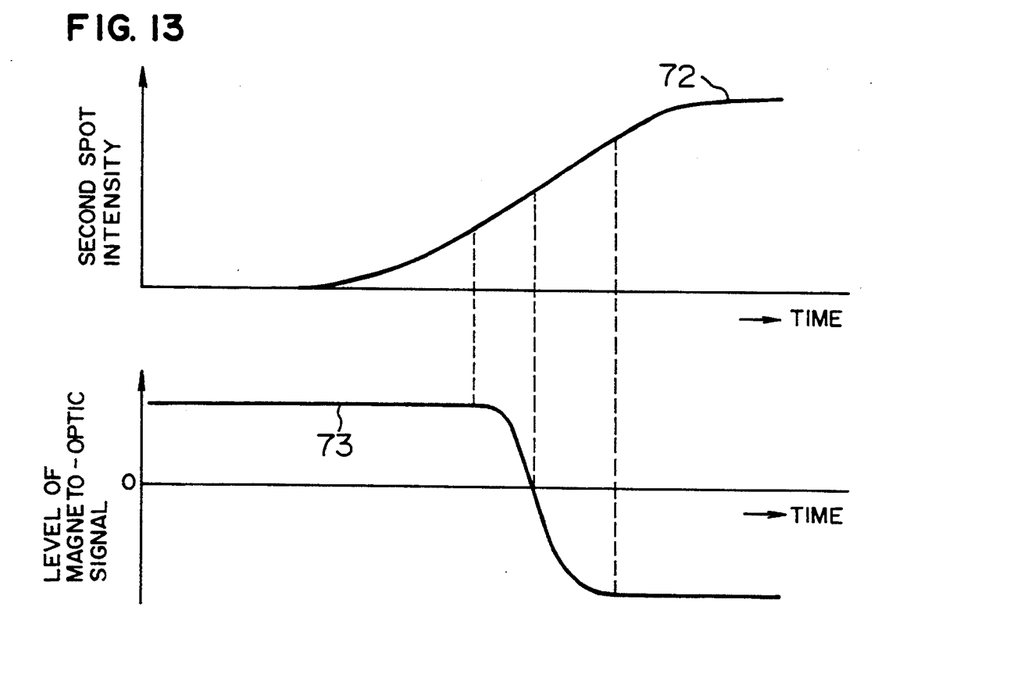
FIG. 13 is a signal waveform diagram showing the correlation of signal waveforms appearing in the operation of the magneto-optic disk memory device of the third embodiment of the present invention.

FIG. 13 is a signal waveform diagram for explaining the correlation of signal waveforms which appear during the operation of the magneto-optic disk memory device of the third embodiment of the present invention. In FIG. 13, a waveform 72 represents the intensity of the second light spot, and a waveform 73 represents the magneto-optic signal which is obtained from the output of the photodetector 56. As shown in FIG. 13, the detection level of the magneto-optic signal 73 changes greatly in response to a change of the intensity 72 of the second light spot. This is because the temperature around the first light spot 61 on the magneto-optic recording film 43 changes with a change of the intensity of the second light spot, and, as shown in FIG. 7, the direction of spontaneous magnetization of the magneto-optic recording film 43, which is composed of a ferrimagnetic material, changes, and, as a result, the polarity of the magneto-optic signal which is detected changes. This magneto-optic signal can be detected both in the case where the first light spot is irradiated with reproducing power and in the case where the first light spot is irradiated with relatively high power to record information during an information recording operation. The magneto-optic signal which is detected during the information recording operation is not a signal which is going to be recorded at this moment, but it is a signal which has already been recorded, or, if no signal has been recorded, it is a signal having polarity and a DC level depending on the direction of spontaneous magnetization which is determined by the temperature of the recording film at that time. This is because, at the time when a magneto-optic signal is detected, an increase in temperature of the recording film is not yet sufficient and hence the information to be recorded has not yet been recorded actually, and therefore a signal which has already been recorded, or, if no signal has been recorded, a signal having polarity and a DC level depending on the direction of spontaneous magnetization, which is determined by the temperature of the recording film at that time, is detected as the magneto-optic signal.

The third embodiment provides a magneto-optic disk memory device which utilizes the above-described characteristics of the detection of the magneto-optic signal in controlling the intensity of the second light spot 62 as required to be adjusted in accordance with the characteristics of the recording film used at that time, which adjustment becomes necessary in performing an actual recording operation by using the information recording method having the overwriting function of the present invention. In this embodiment, the intensity of the second light spot 62 is changed preliminarily at a position on the magneto-optic recording film 43, where no signal has been recorded, just before information is recorded or before the operation is shifted to information recording, and a DC-like signal level of the magneto-optic signal, which is obtained at this time, is detected. Then, use is made of the fact that the polarity of a magneto-optic signal, which is detected by the differential detection method, differs between the signal level of a magneto-optic signal obtained at the time when the intensity of the second light spot is raised and the signal level of a magneto-optic signal obtained at the time when the intensity of the second light spot is reduced, and, by making adjustment so that the difference between the signal levels of the magneto-optic signals becomes maximum, the intensity of the second light spot to be used during the information recording can be controlled. By virtue of controlling the intensity of the second light spot as described above, the temperature around the information recording position on the magneto-optic recording film 43 can be set to a value which causes sufficiently intense spontaneous magnetization that can be used to record information, above and below the compensation temperature of the magneto-optic recording film 43, which is composed of a ferrimagnetic material, by adjusting the intensity of the second light spot.

As described above, in accordance with this third embodiment, the intensity of the second light spot can be controlled at an optimum value for overwriting information.

The above embodiments have been described with respect to the cases that the magnetization at the time of recording and erasing information has respective assumed directions. However, in the case of the magnetization having respective inverse directions, the polarity of signals and the like are inverted. Nevertheless, it is possible for the embodiments to have similar functional effects, respectively.

According to the present invention, in a magneto-optic memory device using a magneto-optic recording medium such as a magneto-optic disk and the like, by merely overwriting new information by using two laser beam spots of the first and second laser beam spots on a magneto-optic recording film on which old information has been recorded, the old information can be erased and replaced by the new information. Thus, a high speed erasing and rerecording (overwriting) operation performed at a speed corresponding to that of a magnetic disk memory device can be realized.

Therefore, the present invention is useful when applied to a data memory device for a computer or an image recording apparatus.

We claim:

1. A magneto-optic memory device for thermo-magnetically recording information on a magneto-optic recording film and reproducing the information by a magneto-optic effect, said magneto-optic recording film being composed of a ferromagnetic material having a compensation temperature which lies within a range between a temperature of said magneto-optic recording film in the information reproducing mode and the Curie temperature of the ferromagnetic material and at which said magneto-optic recording film has spontaneous magnetization of a magnitude necessary for recording the information, said memory device comprising:

light source means for irradiating an information recording position on said recording film with a first light spot and a second light spot which has a light spot diameter greater than a diameter of said first light spot and which is substantially concentric with said first light spot, said light source means comprising first and second lasers having different wavelengths for irradiating said first and second light spots, respectively, and beam combining means for causing said first and second light spots to be substantially concentric, said beam combining means comprising a beam combining prism disposed to receive light emitted from said first and second lasers and a dichroic mirror disposed between said beam combining prism and said first laser;

first modulating means for controlling an intensity of said first light spot so that a temperature at an information recording position of said recording film reaches near the Curie temperature when recording the information; and second modulating means for (i) modulating an intensity of said second light spot between a high intensity and a low intensity so that a temperature around the information recording position of said recording film is changed in accordance with an information signal to be recorded between a first temperature when the second light spot is at said low intensity, said first temperature being lower than the compensation temperature of said recording film and causing a first spontaneous magnetization of a magnitude necessary for recording the information, and a second temperature when the second light spot is at said high intensity, said second temperature being higher than the compensation temperature of said recording film and causing a second spontaneous magnetization of a magnitude necessary for recording the information, and for (ii) controlling said first modulating means to modulate said intensity of said first light spot in accordance with said information signal to be recorded;

wherein both erasing and rerecording of information are simultaneously performed by making use of changes of a direction of a magnetic field caused by said first and said second spontaneous magnetization without using external magnetic field generating means.

2. A magneto-optic memory device for thermo-magnetically recording information on a magneto-optic recording film and reproducing the information by a magneto-optic effect, said magneto-optic recording film being composed of a ferromagnetic material having a compensation temperature which lies within a range between a temperature of said magneto-optic recording film in an information reproducing mode and a Curie temperature of the ferromagnetic material and at which said magneto-optic recording film has spontaneous magnetization of a magnitude necessary for recording the information, said memory device comprising:

light source means for irradiating an information recording position on said recording film with a first light spot and a second light spot which has a light spot diameter greater than a diameter of said first light spot and which is substantially concentric with said first light spot;

first modulating means for controlling an intensity of said first light spot so that a temperature at an information recording position of said recording film reaches near the Curie temperature when recording the information;

second modulating means for modulating an intensity of said second light spot between a high intensity and a low intensity so that a temperature around the information recording position of said recording film is changed in accordance with an information signal to be recorded between a first temperature when the second light spot is at said low intensity, said first temperature being lower than the compensation temperature of said recording film and causing a first spontaneous magnetization of a magnitude necessary for recording the information, and a second temperature when the second light spot is at said high intensity, said second temperature being higher than the compensation temperature of said recording film and causing a second spontaneous magnetization of a magnitude necessary for recording the information; and means for adjusting a level of said high intensity of said second light spot in accordance with an intensity of light reflected from said first light spot during the recording of the information or before the information is recorded;

said means for adjusting comprising:

(a) a photodetecting means for detecting said intensity of said light reflected from said first light spot and for outputting an output signal indicating said intensity of said light reflected from said first light spot; and (b) a differential amplifying means, responsive to said output signal, for outputting a magneto-optic signal to said second modulating means, said magneto-optic signal constituting a modulation maximum value control signal to adjust said level of said high intensity to achieve a maximum difference between said intensity of said light reflected from the first light spot when said second light spot is at said low intensity and when said second light spot is at said high intensity.

3. A magneto-optic memory device according to claim 2, wherein said differential amplifying means receives said output signal and a reference signal having a predetermined value and subtracts said reference signal from said output signal to obtain said magneto-optic signal.

* * * * *